United States Patent
Pavčnik

(10) Patent No.: US 10,906,051 B2
(45) Date of Patent: Feb. 2, 2021

(54) PUSHING-DISPENSING AND/OR DOSING ELEMENT FOR DISPENSING AND/OR DOSING OF MEDIUM, IN PARTICULAR COMPOSITE HEAVY FLUID COMPOUND (CHFC)

(71) Applicant: Bojan Pavčnik, Velenje (SI)

(72) Inventor: Bojan Pavčnik, Velenje (SI)

( * ) Notice: Subject to any disclaimer, the term of this patent is extended or adjusted under 35 U.S.C. 154(b) by 0 days.

(21) Appl. No.: 16/619,569

(22) PCT Filed: Jun. 13, 2018

(86) PCT No.: PCT/SI2018/050018
§ 371 (c)(1),
(2) Date: Dec. 5, 2019

(87) PCT Pub. No.: WO2018/231156
PCT Pub. Date: Dec. 20, 2018

(65) Prior Publication Data
US 2020/0129994 A1    Apr. 30, 2020

(30) Foreign Application Priority Data

Jun. 14, 2017 (SI) .................................. 201700170

(51) Int. Cl.
| | |
|---|---|
| *B05B 1/08* | (2006.01) |
| *B05B 1/30* | (2006.01) |
| *G01F 11/08* | (2006.01) |
| *B61K 3/00* | (2006.01) |

(52) U.S. Cl.
CPC .............. *B05B 1/086* (2013.01); *B05B 1/308* (2013.01); *G01F 11/088* (2013.01); *B61K 3/00* (2013.01)

(58) Field of Classification Search
CPC ....... B05B 1/086; B05B 1/308; G01F 11/088; B61K 3/00
See application file for complete search history.

(56) References Cited

U.S. PATENT DOCUMENTS

| | | | |
|---|---|---|---|
| 1,899,767 A | 2/1933 | Merk | |
| 1,923,449 A | 8/1933 | Merk | |
| 4,130,224 A * | 12/1978 | Norman | G01F 11/088 222/181.2 |
| 4,942,998 A * | 7/1990 | Horvath | B23K 3/0607 222/262 |
| 6,267,266 B1 * | 7/2001 | Smith | B05C 11/1034 222/1 |
| 2010/0102093 A1 | 4/2010 | Ham et al. | |
| 2011/0163121 A1 * | 7/2011 | Katseli | G01F 11/021 141/1 |
| 2018/0229247 A1 * | 8/2018 | Laidler | B05B 1/3013 |

* cited by examiner

*Primary Examiner* — Donnell A Long
(74) *Attorney, Agent, or Firm* — Robert G. Lev

(57) ABSTRACT

A pushing-dispensing and/or dosing element for dispensing of medium, in particular Composite Heavy Fluid Compound (CHFC), solves the technical problem of implantation of avoiding and/or limiting sliding and/or moving parts, exposed to the heavy medium, such as CHFC, thereof by using a flexible cartridge that behaves one way during the pushing of the CHFC, and another way during pumping of said CHFC out of the tank in which it is held.

9 Claims, 1 Drawing Sheet

PUSHING-DISPENSING AND/OR DOSING ELEMENT FOR DISPENSING AND/OR DOSING OF MEDIUM, IN PARTICULAR COMPOSITE HEAVY FLUID COMPOUND (CHFC)

PRIORITY INFORMATION

The present application is a National Stage Entry of PCT/SI2018/050018, filed on Jun. 13, 2018, and claims priority from Slovenian App. No: P-20170017, filed on Jun. 14, 2017.

FIELD OF THE INVENTION

Railway control technology, in particular, precision dispensing of heavy fluid mediums.

BACKGROUND ART

In the state of the art are control systems that include dispensing elements acting on the principle that the dispensing medium which is usually a lubricant but can also be other fluid, often abrasive, travels through said dispensing element and at the same time it is in contact with it. Since these pushing-dispensing and/or dosing elements are precisely coupled, the content of abrasive solid particles in a very short time causes excessive play or the pushing element getting stuck.

When dispensing and/or dosing heavy mediums (known by the abbreviation CHFC, Composite Heavy Fluid Compound) with a high proportion of solid, abrasive particles, damage to sliding and moving part of pushing-dispensing and/or dosing element may occur in a very short time. This means high maintenance costs and production disruptions. The technical problem is therefore the implementation of a pushing-dispensing and/or dosing element that will not have sliding and/or moving parts, or it will have a limited number of said sliding and/or moving parts essentially exposed to medium, preferably CHFC, or plurality thereof.

SUMMARY OF THE INVENTION

A flexible pushing-dispensing and/or dosing element solves the above-mentioned technical problem using a flexible insert that behaves differently during the pushing of CHFC, and differently during pumping of said CHFC out of the tank in which they are held.

A pushing-dispensing and/or dosing element for medium such as composite heavy mediums compound (CHFC) or plurality thereof is characterized in that is comprises pushing means preferably pushing pin traveling between the first position, preferably lower, in which said flexible insert is maximally deformed with the lowest internal volume, and the second position, preferably upper, in which said flexible insert is minimally deformed and has the largest internal volume, further said flexible insert which remains essentially non-deformed during pumping of said medium, preferably CHFC from its reservoir, said reservoir preferably outside of said flexible pushing-dispensing and/or dosing element into a compression volume, said compression volume essentially a through hole made into said flexible insert limited on one side, preferably above, with said pushing mean preferably pushing pin, and on the other side, preferably below, with one-way valve, wherein said pumping (expelling) is performed by movement of said pushing means preferably pushing pin from said second position to said first position, and said flexible insert abuts onto a housing of pushing-dispensing and/or dosing element around its perimeter, said pushing-dispensing and/or dosing element deformed during pushing of said pushing means preferably pushing pin acting onto the upper flange of pushing-dispensing and/or dosing element in such a way that through hole is narrowed and due to decrease of internal volume pushes predetermined quantity of medium, preferably CHFC through said one-way valve.

Medium according to this invention can be chosen from the group containing Composite Heavy Fluid Compound, lubricant, material for increasing friction.

Flexible insert according to this invention may be bound on one side, preferably upper, with a flange, preferably upper flange, and on the other side with a flange, preferably lower flange in order to preserve essentially uniform deformation od said flexible insert.

Pushing-dispensing and/or dosing element optionally comprises one-way valve to prevent return of medium, preferably CHFC back into the compression volume.

Method of dispensing and/or dosing of medium, preferably CHFC, by means of pushing-dispensing and/or dosing element, comprises the following steps:
  lifting of pushing means preferably pushing pin in direction from flexible insert which, due to resulting vacuum, said referring to pressure lower then pressure in said reservoir, pumps in a medium, preferably CHFC, from a reservoir, preferably outside reservoir, into a compression volume which is essentially a through hole through a flexible insert, said through hole limited on one side, preferably upper, with pushing means preferably pushing pin, and on the other side, preferably lower, with one-way valve;
  pushing of pushing means preferably pushing pin toward flexible insert which due to resulting increased pressure deforms said flexible insert thereby reducing the volume of compression volume and consequently expelling said medium, preferably CHFC, through one-way valve from pushing-dispensing and/or dosing element.

Below the solution is further explained by means of embodiment and figures wherein the figures form part of the specifications, and present.

DETAILED DESCRIPTION OF THE PREFERRED EMBODIMENTS

Figure 1:
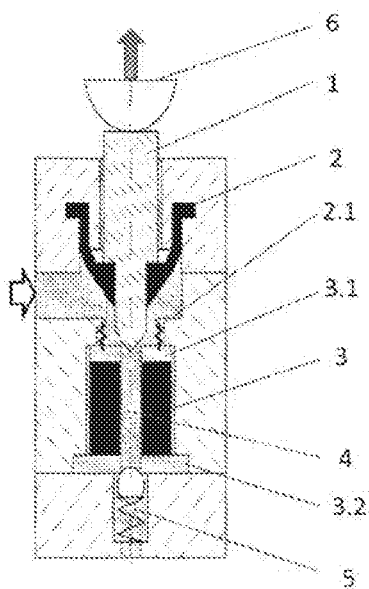
FIG. 1 presents the suction part of the cycle presenting pushing means preferably pushing pin (1), pushing means preferably pushing pin membrane (2), flexible insert membrane (2.1), flexible insert (3), upper flange of flexible insert (3.1), lower flange of flexible insert (3.2), compression volume (4), one-way valve (5), pushing means preferably pushing pin drive (6).
Figure 2:
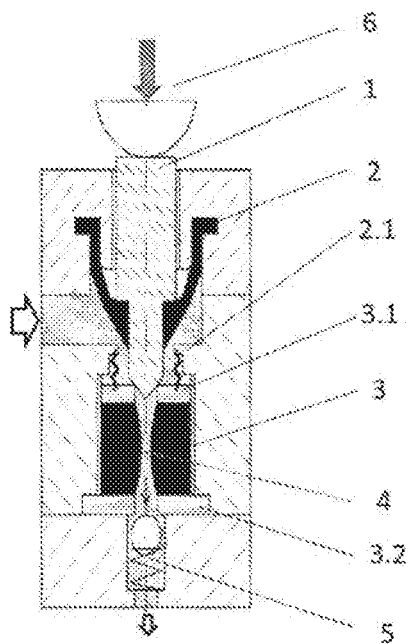
FIG. 2 presents expelling part of the cycle presenting pushing means preferably pushing pin (1), pushing means preferably pushing pin membrane (2), flexible insert membrane (2.1), flexible insert (3), upper flange of flexible insert (3.1), lower flange of flexible insert (3.2), compression volume (4), one-way valve (5), pushing means preferably pushing pin drive (6).

This embodiment presents movement of the medium, preferably CHFC through pushing-dispensing and/or dosing element in such a way that expelling of said medium, preferably CHFC which is comprised within compression volume (4) is performed by means of flexible insert (3). Said flexible insert (3) with two flanges preferably of metal (3.1, 3.2) is of resilient material, preferably of rubber, synthetic rubber or similar. Flexible insert (3) is on the perimeter limited in such a way that it cannot deform in this perimeter, for example, by buckling or similar. Pushing means preferably pushing pin (1) is acting on said flexible insert (3) in such a way that said flexible insert (3) compresses and deforms on the inside of said compression volume (4). During pressing of said pushing means preferably pushing pin (1), in the embodiment traveling downward, said compression volume (4) is reduced in size, and this reduction in volume of said compression volume (4) defines quantity of said medium, preferably CHFC, to be expelled from said pushing-dispensing and/or dosing element. Expelling step is presented in FIG. 2 and shows said medium, preferably CHFC, to be expelled from said flexible insert. In this embodiment the guiding of said pushing means preferably pushing pin (1) is separate, and outside from medium, preferably CHFC, volume by pushing means preferably pushing pin membrane (2) and flexible insert membrane (2.1). Said pushing means preferably pushing pin membrane (2) also provides for return of said pushing means preferably pushing pin (1) after it has finished pushing and both, suction, and expelling steps of pumping cycle is completed. Pushing means preferably pushing pin (1) guiding is therefore provided outside medium, preferably CHFC, volume thereby avoiding abrasive properties of said medium, preferably CHFC. The pushing means preferably pushing pin drive (6) is provided in any state-of-the-art fashion, for example, by means of ex-center driven by electromotor, electromagnetic drive, pneumatic drive, and similar. One-way valve (5) presents return of material into compression volume (4).

A pushing-dispensing and/or dosing element for medium such as Composite Heavy Fluid Compound (CHFC) or plurality thereof is characterized in that it comprises a flexible insert (3) having a through hole, said through hole essentially defining compression volume (4), further comprising a pushing means preferably pushing pin (1) traveling between the first position, preferably lower, in which said flexible insert (3) is deformed resulting in said compression volume (4) having smaller internal volume compared to internal volume of said flexible insert (3) in its non-deformed form, and the second position, preferably upper, in which said flexible insert (3) is minimally deformed or non-deformed resulting in said compression volume (4) having larger internal volume compared said flexible insert (3) in its deformed form, further comprising medium, preferably CHFC, reservoir preferably outside of said pushing-dispensing and/or dosing element, said compression volume (4) between said pushing means preferably pushing pin (1) on one side, preferably above, and expelling orifice, preferably one-way valve (5) on another side, preferably below, wherein pumping cycle is comprised of a suction step for pumping of said medium, preferably CHFC into said compression volume (4), and expelling step for pumping of said medium, preferably CHFC from said compression volume (4), into position where said medium, preferably CHFC, is needed, wherein said suction step is performed by movement of said pushing means preferably pushing pin (1) from said first position to said second position, and wherein said expelling step is performed by movement of said pushing means preferably pushing pin (1) from said second position to said first position, wherein said flexible insert (3) is arranged within a housing of said pushing-dispensing and/or dosing element in such a way that deformation of outside perimeter of said flexible insert (3) is essentially prevented, and deformation of through hole of said flexible insert (3) is provided during pushing of said pushing means preferably pushing pin (1) acting on said flexible insert (3) in such a way that said through hole is reduced in volume and due to decrease of internal volume expels predetermined quantity of medium, preferably CHFC through said expelling orifice, preferably one-way valve (5).

Flexible insert (3) according to this embodiment can be bound on one side, preferably upper, with a flange, preferably upper flange (3.1), and on the other side with a flange, preferably lower flange (3.2) in order to preserve essentially uniform deformation of said flexible insert (3).

Pushing-dispensing and/or dosing element wherein said expelling orifice is a one-way valve (5) to prevent return of medium, preferably CHFC back into the compression volume (4).

Pushing-dispensing and/or dosing element according to this invention can further comprise one or more of pushing means preferably pushing pin (1), one or more flexible inserts (3), one or more pushing means preferably pushing pin membranes (2), one or more flexible insert membranes (2.1), one or more pushing means preferably pushing pin drives (6).

Flexible insert (3) bound between said upper (3.1) and lower (3.2) flange can expel approximately same amount of medium, preferably CHFC, or plurality thereof with each pumping cycle, said pumping cycle comprising suction and expelling steps.

Pushing-dispensing and/or dosing element according to this invention can further comprise pushing means preferably pushing pin membrane (2) separating inner and outer part of said pushing means preferably pushing pin (1); said inner part comprises chamber comprising medium, preferably CHFC, or plurality thereof, while the outer part comprises drive (6) with a guide for guiding of said pushing means preferably pushing pin (1) allowing said pushing means preferably pushing pin (1) movement toward said flexible insert (3) and away from it during pumping cycle.

Pushing-dispensing and/or dosing element according to this invention can further comprise flexible insert membrane (2.1) to prevent medium, preferably CHFC, or plurality thereof access to outer perimeter of said flexible insert (3), mainly to prevent abrasive properties of said medium, preferably CHFC, or plurality thereof having effect on said perimeter of said flexible insert (3) but also to prevent loss of said medium, preferably CHFC, or plurality thereof.

Pushing-dispensing and/or dosing element according to this invention can further comprise pushing means preferably pushing pin (1) or plurality thereof for allowing of controlled fluctuation of medium, preferably CHFC, or plurality thereof, through said flexible insert (3).

Method of dispensing and/or dosing of medium, preferably CHFC, or plurality thereof comprises the following steps:

lifting of pushing means preferably pushing pin (1) in direction away from flexible insert (3) which, due to resulting vacuum, said vacuum referring to pressure lower then pressure in said reservoir, pumps a medium, preferably CHFC, from a reservoir, preferably outside reservoir, into a compression volume (4) which is essentially a through hole through a flexible insert (3), said through hole limited on one side, preferably upper, with pushing means preferably pushing pin (1), and on the other side, preferably lower, with expelling orifice preferably one-way valve (5);

pushing of pushing means preferably pushing pin (1) toward flexible insert (3) which due to resulting increased pressure deforms said flexible insert (3) thereby reducing volume of compression volume (4) and consequently expelling said medium, preferably CHFC, through expelling orifice preferably one-way valve (5) from pushing-dispensing and/or dosing element.

Method according to this invention is carried out by use of pushing-dispensing and/or dosing element as described herein.

The invention claimed is:

1. A dispensing mechanism adapted for a class of medium including composite heavy fluid compounds (CHFC), wherein said dispensing mechanism is adapted to minimize wear and deterioration of said dispensing mechanism, said dispensing mechanism comprising:

a) an entryway for passing CHFC medium from an external reservoir through said dispensing mechanism;

b) a pushing mechanism configured to be moved into a first position sealing said entryway, and a second position out of said entryway wherein said pushing mechanism comprises a drive pin configured to be moved to seal a first end of said flexible insert;

c) an outlet orifice for passing CHFC medium from said dispensing mechanism wherein said outlet orifice comprises a one-way valve configured to prevent return of said CHFC medium into said entryway;

d) a flexible insert arranged between said entryway, and said outlet orifice, said flexible insert including a relatively inflexible outer wall and a relatively flexible inner wall, said flexible inner wall defining a medium passage therebetween, said medium passage having a first volume of space wherein said flexible insert is bounded on a first side with an upper flange, and on a second side with a lower flange, said flanges being configured to preserve substantially uniform deformation of said flexible insert;

e) wherein said flexible insert is configured so that said inner flexible wall remains undistorted when said pushing mechanism is in said second position thereby establishing said first volume of space in said medium passage, and said inner flexible walls flex inwardly when said pushing mechanism is driven to said first position, thereby reducing said first volume of space to a second smaller volume of space, and expelling a predetermined amount of the said CHFC medium through said outlet orifice.

2. A dispensing element according to claim 1, wherein said flexible insert expels substantially the same amount of said CHFC medium each time said pin drive is moved from said second position to said first position.

3. A dispensing element according to claim 2, further comprising a pin membrane separating inner and outer parts of said drive pin; said inner part interfacing with said CHFC medium, and said outer part interfacing with an external drive, said pin membrane configured for guiding of said drive pin movement of said drive pin toward said flexible insert and away from said flexible insert to establish a pumping cycle.

4. A dispensing element according to claim 3, further comprising a flexible insert membrane configured to prevent CHFC medium access to said outer wall of said flexible insert thereby preventing loss of said medium.

5. A dispensing element according to claim 4, further comprising wherein said external medium reservoir is connected between said pin membrane and said flexible membrane to facilitate controlled movement of medium through said flexible insert.

6. A dispensing element according to claim 5, wherein said CHFC medium in chosen from a group consisting of lubricants and materials for increasing friction.

7. A method of dispensing medium using a flexible insert having relatively inflexible outer walls and relatively flexible inner walls, said inner walls defining a medium passage with an upper opening and a lower opening having a first volume of space wherein said flexible insert is bounded on a first side with an upper flange, and on a second side with a lower flange, said flanges being configured to preserve substantially uniform deformation of said flexible insert, said method comprising the steps of:

a) setting a drive pin in a first position above and away from said flexible insert, thereby creating a flow path between an external reservoir and a first end of said medium passage;

b) flowing said medium from said external reservoir to said upper opening of said medium passage;

c) filling said first volume of space with said medium from said external reservoir;

d) forcing said drive pin into a second position to seal said upper opening of said passage;

e) substantially uniformly flexing said inner walls of said flexible insert inwardly to decrease said first volume of space of said passage thereby expelling a predetermined amount of medium from said passage; and, f) flowing said predetermined amount of expelled medium away from said flexible insert, and sealing said passageway against return of said expelled a medium wherein said outlet orifice is a one-way valve configured to prevent return of said CHFC medium into said entryway.

8. The method of claim 7, wherein said medium is constituted by a composite heavy fluid compound (CHFC) configured as a lubricant.

9. The method of claim 7, further comprising the steps of:

g) withdrawing said drive pin to said first position; and, h) repeating steps b-f, thereby obtaining an equal amount of expelled medium each time said drive pin is forced to seal said upper opening of said medium passage.

* * * * *